United States Patent
Odajima et al.

(10) Patent No.: US 7,758,833 B2
(45) Date of Patent: Jul. 20, 2010

(54) EXHAUST GAS PURIFYING APPARATUS FOR INTERNAL COMBUSTION ENGINE

(75) Inventors: Akira Odajima, Wako (JP); Isao Kaneko, Wako (JP); Shingo Tsuruta, Wako (JP); Yoshihiko Watanabe, Wako (JP); Hidetaka Maki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/241,714

(22) Filed: Sep. 30, 2008

(65) Prior Publication Data

US 2009/0087364 A1    Apr. 2, 2009

(30) Foreign Application Priority Data

Oct. 2, 2007    (JP) .............................. 2007-258228

(51) Int. Cl.
*B01D 53/50*    (2006.01)
*B01D 53/56*    (2006.01)
*B01D 53/94*    (2006.01)
*F01N 3/18*    (2006.01)
*G05D 21/00*    (2006.01)

(52) U.S. Cl. .............. 423/213.2; 423/213.7; 423/239.1; 423/244.09; 423/215.5; 423/DIG. 5; 423/DIG. 6; 422/105; 422/108; 60/295; 60/299; 60/301

(58) Field of Classification Search .............. 423/213.2, 423/213.7, 239.1, 244.09, 215.5, DIG. 5, 423/DIG. 6; 422/105, 108; 60/295, 299, 60/301
See application file for complete search history.

(56) References Cited

U.S. PATENT DOCUMENTS

| 5,974,791 | A  | * | 11/1999 | Hirota et al. ................... 60/276 |
| 6,962,045 | B2 | * | 11/2005 | Kitahara et al. ................ 60/295 |
| 2006/0137327 | A1 | * | 6/2006 | Shirakawa et al. ............. 60/285 |

FOREIGN PATENT DOCUMENTS

| JP | 2003-155925 | 5/2003 |
| JP | 2005-83353  | 3/2005 |
| JP | 2005-188387 | 7/2005 |
| JP | 2007-100572 | 4/2007 |

OTHER PUBLICATIONS

Japanese Office Action for Application No. 2007-258228, dated Sep. 1, 2009.

* cited by examiner

*Primary Examiner*—Timothy C Vanoy
(74) *Attorney, Agent, or Firm*—Lahive & Cockfield, LLP; Anthony A. Laurentano

(57) ABSTRACT

An exhaust gas purifying apparatus for an internal combustion engine is provided with a NOx removing device and a particulate filter in an exhaust system. A temperature of the exhaust system is detected. A switching control is performed for alternately performing a process for removing sulfur oxide accumulated in said NOx removing device and a regeneration process for burning particulates trapped in said particulate filter, when it is determined to be necessary to perform at least one of the removal of the sulfur oxide in said NOx removing device and the regeneration of the particulate filter. The switching control is performed according to the detected exhaust system temperature.

8 Claims, 4 Drawing Sheets

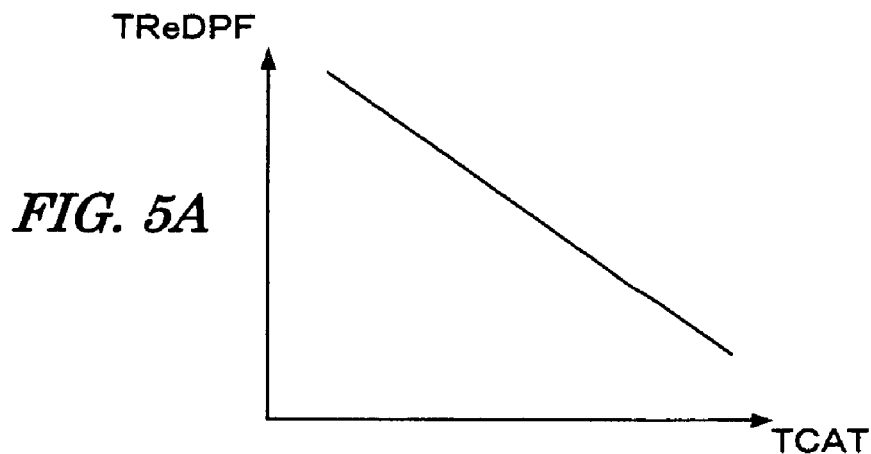
*FIG. 5A*
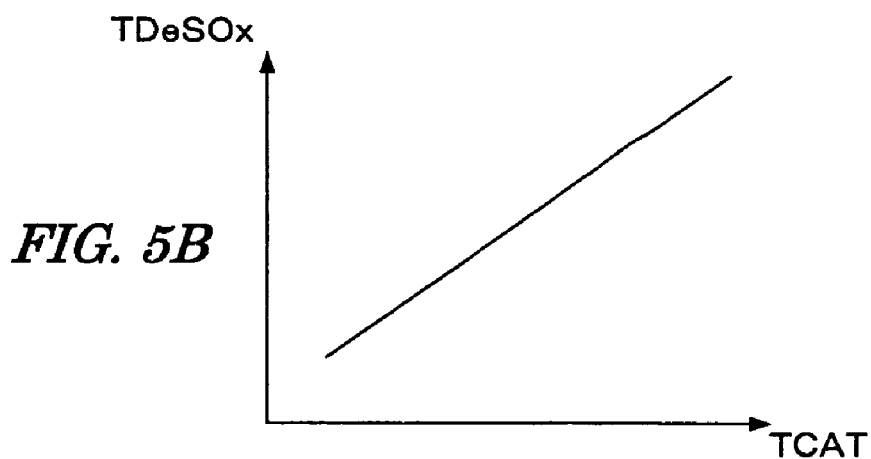
*FIG. 5B*
*FIG. 6*
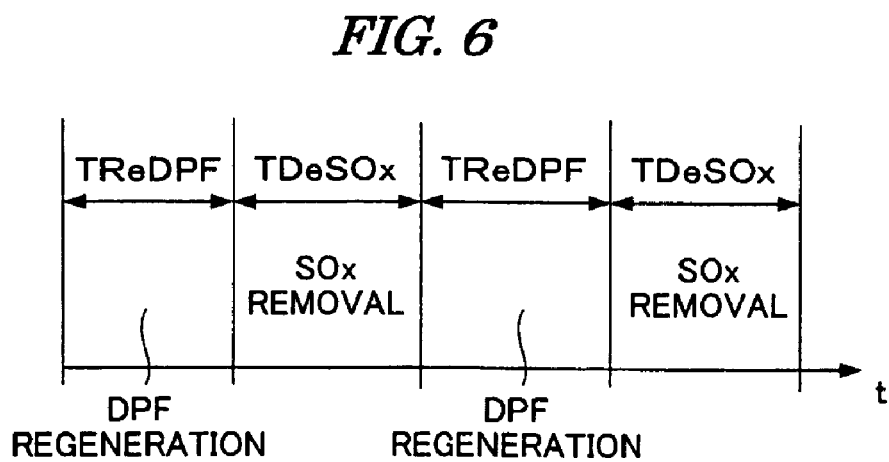

EXHAUST GAS PURIFYING APPARATUS FOR INTERNAL COMBUSTION ENGINE

BACKGROUND OF THE INVENTION

1. Field of the Invention

The present invention relates to an exhaust gas purifying apparatus for an internal combustion engine, and particularly to an apparatus having a NOx removing device and a particulate filter (hereinafter referred to as "DPF") for trapping particulates (particulate matter) in exhaust gases of the internal combustion engine.

2. Description of the Related Art

The NOx removing device, which traps NOx in an oxidizing state where a concentration of oxygen in exhaust gases is relatively high, and reduces NOx in a reducing state where a concentration reducing components in exhaust gases is comparatively high, is well known. The NOx removing device traps not only NOx but also sulfur oxide generated by oxidization of sulfur contained in fuel, resulting in reduction of a trapping capacity. Therefore, when an amount of trapped sulfur oxide becomes large, it is necessary to perform a process for removing the trapped sulfur oxide.

On the other hand, the DPF is widely used for trapping particulates (particulate matter) which mainly consist of soot in exhaust gases. Since there is a limit in the amount of particulates that can be trapped in the DPF, it is necessary to timely perform a DPF regeneration process for burning the particulates trapped in the DPF.

Japanese Patent Laid-open No. 2005-188387 discloses a method for alternately performing the above-described sulfur oxide removal process and DPF regeneration process. Specifically, the temperature of the DPF is maintained at a temperature which is equal to or greater than a temperature sufficient for burning the particulates and the exhaust gases are controlled to be in the oxidizing state, to perform the DPF regeneration. Subsequently, the temperature of the NOx removing device is maintained at a temperature which is sufficient for removing sulfur oxide and the exhaust gases are controlled to be in the reducing state, to perform the sulfur oxide removal.

In the above-described conventional method, a repetition time period of the sulfur oxide removal process and the DPF regeneration process is set to a predetermined time period or a time period set according to an amount of particulates accumulated in the DPF (a residual amount of particulates in the DPF). However, it is difficult to control the exhaust gases to be alternately in the oxidizing state and in the reducing state while controlling the temperatures of the NOx removing device and the DPF to be desired values. Therefore, there is a possibility that the temperature of the NOx removing device or other catalysts for purifying exhaust gases may become excessively high, thereby accelerating deterioration of the NOx removing device or other exhaust gas purifying catalysts.

SUMMARY OF THE INVENTION

The present invention was made contemplating the above-described point, an object of the invention is to provide an exhaust purifying apparatus, which can appropriately perform a switching control for alternately performing the sulfur oxide removal process and the DPF regeneration process, and maintain the temperature of the NOx removing device or other catalysts for purifying exhaust gases within a proper range.

To attain the above object, the present invention provides an exhaust gas purifying apparatus for an internal combustion engine, including NOx removing means (22) provided in an exhaust system of the engine, a particulate filter (23) provided in the exhaust system, temperature detecting means (24), sulfur oxide removing means, regeneration means, and switching control means. The temperature detecting means detects a temperature (TCAT) of the exhaust system. The sulfur oxide removing means performs a process for removing sulfur oxide accumulated in the NOx removing means (22). The regeneration means performs a regeneration process for burning particulates trapped in the particulate filter (23). The switching control means performs a switching control which makes the sulfur oxide removing means and the regeneration means alternately operate, when it is determined to be necessary to perform at least one of the removal of the sulfur oxide and the regeneration of the particulate filter (23). Further, the switching control means performs the switching control according to the exhaust system temperature (TCAT) detected by the temperature detecting means (24).

With this configuration, when it is determined to be necessary to perform at least one of the removal of the sulfur oxide and the regeneration of the particulate filter, the removal process of the sulfur oxide and the regeneration process of the particulate filter are alternately switched to be performed according to the detected exhaust system temperature. By appropriately controlling each of the execution time periods of the sulfur oxide removal process and the particulate filter regeneration process according to the exhaust system temperature, the exhaust system temperature can be maintained within a proper range. Consequently, deterioration of the NOx removing means or other exhaust gas purifying catalysts can be suppressed.

Preferably, the regeneration means performs a temperature control so that the exhaust system temperature (TCAT) coincides with a target temperature (T2). The switching control means stops the operation of the regeneration means when the exhaust system temperature (TCAT) has reached a predetermined control range (T2±ΔT) in the vicinity of the target temperature (T2) during the operation of the regeneration means, and starts the operation of the sulfur oxide removing means.

With this configuration, the temperature control is performed in the regeneration process of the particulate filter so that the exhaust system temperature coincides with the target temperature. When the exhaust system temperature has reached the predetermined control range in the vicinity of the target temperature during execution of the regeneration process, the regeneration process is terminated and the sulfur oxide removal process is started. Since the temperature required to burn particulates is close to the temperature required to remove sulfur oxide, it is possible to remove the sulfur oxide by appropriately setting the target temperature.

Preferably, the sulfur oxide removing means supplies reducing components to the exhaust system so as to make the exhaust gases of the engine be in a reducing state. The switching control means stops the operation of the sulfur oxide removing means when the exhaust system temperature (TCAT) has deviated from a predetermined limit range (T1-T3) during the operation of the sulfur oxide removing means, and starts the operation of the regeneration means.

With this configuration, reducing components are supplied to the exhaust system in the sulfur oxide removal process so as to make the exhaust gases of the engine be in the reducing state. The sulfur oxide removal process is terminated when the exhaust system temperature has deviated from the predetermined limit range during the sulfur oxide removal process, and the regeneration process of the particulate filter is started. When the exhaust system temperature becomes too high or becomes too low during the sulfur oxide removal process, the process is switched to the regeneration process. Consequently, the exhaust system temperature can be controlled to a temperature in the vicinity of the target temperature, which makes it possible to appropriately perform the regeneration process and to restart the sulfur oxide removal process.

Preferably, the switching control means sets a first time period (TDeSOx) in which the sulfur oxide removing means operates and a second time period (TReDPF) in which the regeneration means operates, according to the exhaust system temperature (TCAT), and makes the sulfur oxide removing means and the regeneration means respectively operate for the corresponding set time period (TDeSOx, TReDPF).

With this configuration, the first time period for performing the sulfur oxide removal process and the second time period for performing the regeneration process are set according to the exhaust system temperature. The sulfur oxide removal process and the regeneration process are respectively performed for the corresponding set time period. When the exhaust system temperature is comparatively high, the sulfur oxide removal process can be performed for a long time period and the exhaust system temperature can be reduced by performing the sulfur oxide removal process. On the other hand, when the exhaust system temperature is comparatively low, the temperature of the exhaust gases flowing into the particulate filter can be raised to burn the particulates trapped in the particulate filter by performing the regeneration process for a comparatively long time period. Therefore, by setting each of the first and second time periods according to the exhaust system temperature at the time when each process is started, the exhaust system temperature can be appropriately maintained to perform the sulfur oxide removal process and the regeneration process of the particulate filter.

Preferably, the exhaust system temperature is a temperature in the vicinity of the NOx removing means.

With this configuration, the temperature of the NOx removing means can be maintained at an appropriate temperature.

Preferably, the exhaust gas purifying apparatus further includes an exhaust gas purifying catalyst disposed upstream of the NOx removing means and the particulate filter in the exhaust system of the engine, wherein the exhaust system temperature is a temperature in the vicinity of the exhaust gas purifying catalyst.

With this configuration, the temperature of the exhaust gas purifying catalyst can be maintained at an appropriate temperature.

BRIEF DESCRIPTION OF THE DRAWINGS

FIGS. 5A and 5B show tables referred to in the process of FIG. 4;

FIG. 6 is a time chart for illustrating the process of FIG. 4.

DETAILED DESCRIPTION OF THE PREFERRED EMBODIMENTS

Preferred embodiments of the present invention will now be described with reference to the drawings.

First Embodiment

Figure 1:
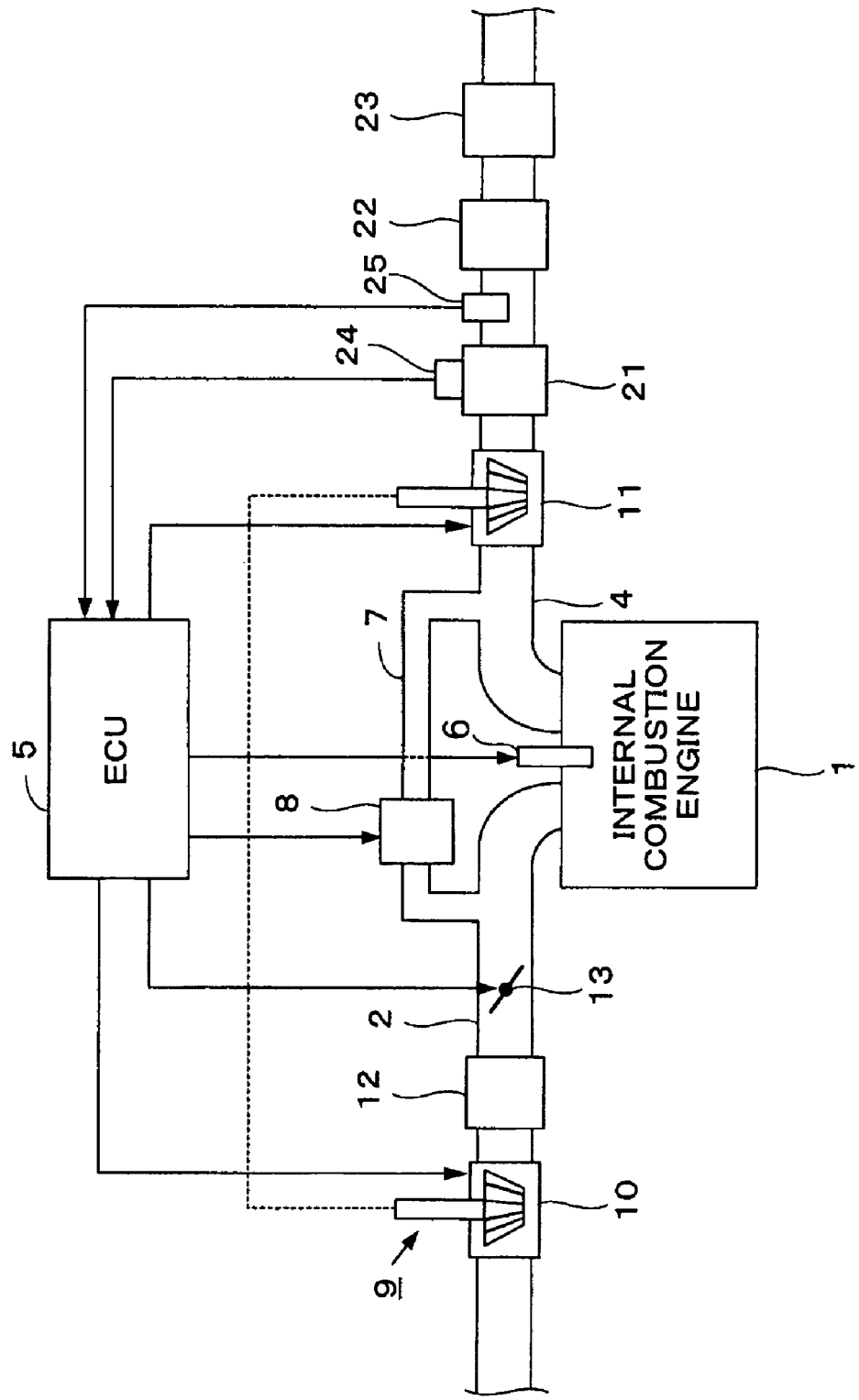
FIG. 1 shows a configuration of an internal combustion engine and a control system therefor according to an embodiment of the present invention.

FIG. 1 is a schematic diagram showing a configuration of an internal combustion engine and a control system therefor according to one embodiment of the present invention. An internal combustion engine 1 (hereinafter referred to merely as "engine") is a diesel engine in which fuel is injected directly into cylinders. Each cylinder of the engine 1 is provided with a fuel injection valve 6. The fuel injection valve 6 is electrically connected to the electronic control unit 5 (hereinafter referred to as "ECU"). A valve opening period and a valve opening timing of the fuel injection valve 6 are controlled by the ECU 5.

The engine 1 is provided with an intake pipe 2, an exhaust pipe 4, and a turbocharger 9. The turbocharger 9 has a turbine 11 driven by the kinetic energy of exhaust gases and a compressor 10 for compressing the intake air. The compressor 10 is rotationally driven by the turbine 11.

The turbine 11 has a plurality of movable vanes (not shown), and is configured so that the rotational speed of the turbine 11 can be varied by changing an opening of the movable vanes. The vane opening of the turbine 11 is electromagnetically controlled by the ECU 5.

The intake pipe 2 is provided with an intercooler 12 on the downstream side of the compressor 10 for cooling pressurized air, and an intake shutter (throttle valve) 13 for controlling the intake air amount. The intake shutter 13 is controlled to be opened/closed by the ECU 5 through an actuator (not shown).

An exhaust gas recirculation passage 7 is provided between the upstream side of the turbine 11 in the exhaust pipe 4 and the downstream side of the intake shutter 13 in the intake pipe 2. The exhaust gas recirculation passage 7 recirculates a part of exhaust gases to the intake pipe 2. The exhaust gas recirculation passage 7 is provided with an exhaust gas recirculation control valve (hereinafter referred to as "EGR valve") 8 for controlling an exhaust gas recirculation amount. The EGR valve 8 is an electromagnetic valve having a solenoid. The valve opening of the EGR valve 8 is controlled by the ECU 5.

The exhaust pipe 4 is provided with a catalytic converter 21 for purifying the exhaust gases, a lean NOx catalyst, and a DPF 23 in this order from the upstream side. The catalytic converter 21, the lean NOx catalyst, and the DPF 23 are disposed downstream of the turbine 11.

The catalytic converter 21 contains an oxidation catalyst for accelerating oxidation of hydrocarbon and carbon monoxide in the exhaust gases. Further, the catalytic converter 21 may include the well-known three-way catalyst.

The lean NOx catalyst 22 is configured so that NOx is trapped in a state where an oxygen concentration in the exhaust gases is comparatively high, i.e., a concentration of reducing components (HC, CO) is comparatively low, and the trapped NOx is reduced by the reducing components and discharged in a state where the reducing components concentration in the exhaust gases is comparatively high. In addition to NOx, sulfur oxide (hereinafter referred to as "SOx") is also trapped in the lean NOx catalyst 22, which deteriorates NOx purifying performance of the lean NOx catalyst 22. Therefore, the SOx removal process for removing SOx is timely performed.

The DPF 23 traps soot which consists of particulates whose main component is carbon (C) in the exhaust gases, when the exhaust gases pass through small holes in the filter wall. Specifically, the inflowing soot is accumulated on the surface of the filter wall and in the small holes of the filter wall. For example, ceramics such as silicon carbide (SiC) or porous metal may be used as materials for the filter wall.

If the DPF 23 traps soot up to the upper limit of the soot trapping capacity, the exhaust pressure excessively rises and the DPF 23 is chocked. Therefore, it is necessary to timely perform the regeneration process for burning the trapped soot. In the regeneration process, the post injection is performed for raising the temperature of exhaust gases to the burning temperature of soot. The post injection is performed during the expansion stroke or the exhaust stroke through the fuel injection valve 6. The fuel injected by the post injection burns in the catalytic converter 21, which raises the temperature of the exhaust gases flowing into the lean NOx catalyst 22 and the DPF 23.

The catalytic converter 21 is provided with a catalyst temperature sensor 24 for detecting a catalyst temperature TCAT of the catalytic converter 21. Further, an oxygen concentration sensor 25 is provided between the catalytic converter 21 and the lean NOx catalyst 22. The detection signals of sensors 24 and 25 are supplied to the ECU 5.

Sensors for detecting engine operating conditions, such as an accelerator sensor, an engine rotational speed sensor, and a coolant temperature sensor (which are not shown) are connected to the ECU 5. The accelerator sensor detects an operation amount AP of the accelerator of the vehicle driven by the engine 1. The engine rotational speed sensor detects an engine rotational speed NE. The coolant temperature sensor detects an engine coolant temperature TW. The detection signals of these sensors are supplied to the ECU 5.

The ECU 5 includes an input circuit, a central processing unit (hereinafter referred to as "CPU"), a memory circuit, and an output circuit. The input circuit performs various functions, including shaping the waveforms of input signals from the various sensors, correcting the voltage levels of the input signals to a predetermined level, and converting analog signal values into digital values. The memory circuit preliminarily stores various operation programs to be executed by the CPU and stores the results of computations or the like by the CPU. The output circuit supplies drive signals to the fuel injection valves 6, the EGR valve 8, and the like.

In this embodiment, the DPF regeneration process and the SOx removal process of the lean NOx catalyst 22 (hereinafter referred to as "SOx removal process") are alternately performed according to the detected catalyst temperature TCAT.

Figure 2:
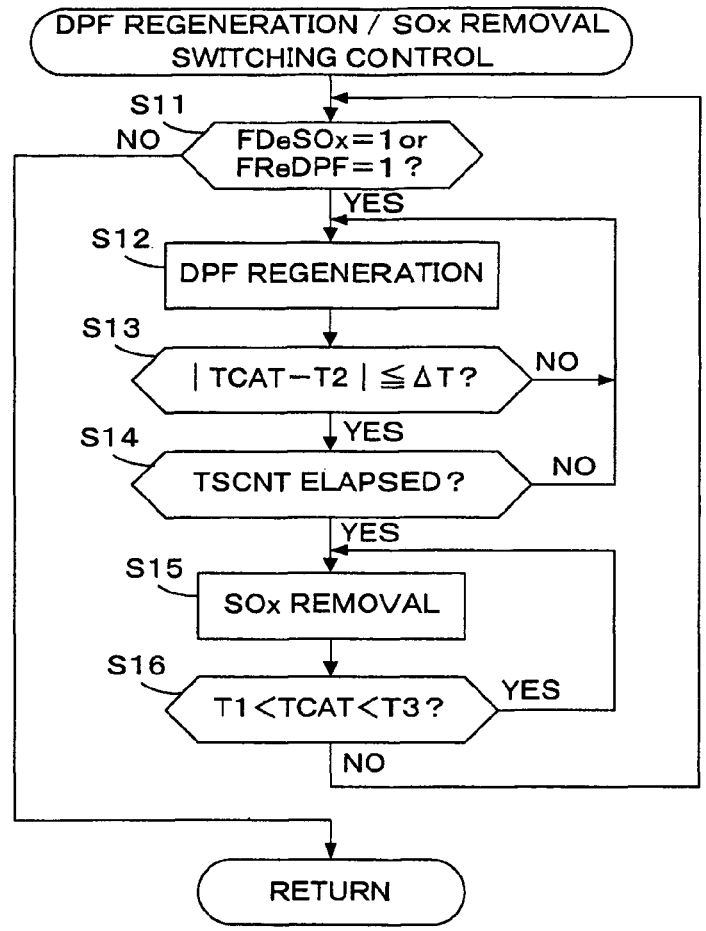
FIG. 2 is a flowchart (first embodiment) of a process for performing a regeneration process of a particulate filter and a sulfur oxide removal process of a lean NOx catalyst.

FIG. 2 is a flowchart showing a method of a process for alternately performing the DPF regeneration process and the SOx removal process.

In step S11, it is determined whether or not a SOx removal flag FDeSOx or a DPF regeneration flag FReDPF is equal to "1". The SOx removal flag FDeSOx is set to as described below in a process which is not shown. An estimated value MSOx of an amount of SOx accumulated in the lean NOx catalyst 22 is calculated according to the engine operating condition (the estimated value MSOx will be hereinafter referred to as "estimated SOx amount MSOx"). If the estimated SOx amount MSOx reaches a predetermined upper limit SOx amount MSOxTHH, the SOx removal flag FDeSOx is set to "1". Further, when the SOx removal process is being performed, the estimated SOx amount MSOx is reduced according to an execution time period of the SOx removal process and the engine operating condition. If the estimated SOx amount MSOx decreases to reach a predetermined lower limit SOx amount MSOxTHL, the SOx removal flag FDeSOx is returned to "0".

On the other hand, the DPF regeneration flag FReDPF is set as described below in a process which is not shown. An estimated value MPM of an amount of particulates trapped in the DPF 23 is calculated according to the engine operating condition (the estimated value MPM will be hereinafter referred to as "estimated particulate amount MPM"). If the estimated particulate amount MPM reaches a predetermined upper limit PM amount MPMTHH, the DPF regeneration flag FReDPF is set to "1". Further, when the DPF regeneration process is being performed, the estimated particulate amount MPM is reduced according to an execution time period of the DPF regeneration process and the engine operating condition. If the estimated particulate amount MPM decreases to reach a predetermined lower limit PM amount MPMTHL, the DPF regeneration flag FReDPF is returned to "0".

If the answer to step S11 is negative (NO), i.e., both of the SOx removal flag FDeSOx and the DPF regeneration flag FReDPF are equal to "0", the process immediately ends.

If the answer to step S11 is affirmative (YES), the DPF regeneration process is first performed (step S12). Specifically, a feedback control of a fuel injection amount in a post injection (hereinafter referred to as "post injection amount") TPST is performed so that the detected catalyst temperature TCAT coincides with a target temperature T2 (e.g., 600 degrees centigrade). In step S13, it is determined whether or not the absolute value of a difference between the catalyst temperature TCAT and the target temperature T2 is equal to or less than a predetermined difference ΔT (e.g., 5 to 10 degrees centigrade). In other words, it is determined whether or not the catalyst temperature TCAT is within a predetermined control range of (T2±ΔT). If the answer to step S13 is negative (NO), the process immediately returns to step S12.

If |TCAT-T2| is equal to or less than ΔT in step S13, it is determined whether or not that a predetermined continuation time period TSCNT (e.g., 5 seconds) has elapsed from the time the answer to step S13 becomes affirmative (YES). If the answer to step S14 is negative (NO), the process returns to step S12, in which the DPF regeneration process is continued.

If the answer to step S14 becomes affirmative (YES), the DPF regeneration process is terminated and the SOx removal process is started (step S15). In the SOx removal process, it is necessary to raise the concentration of reducing components in the exhaust gases. Therefore, a feedback control of the post injection amount TPST is performed so that a converted air fuel ratio AFC, which is calculated from the oxygen concentration detected by the oxygen concentration sensor 25, coincides with a predetermined rich air-fuel ratio AFRO.

In step S16, it is determined whether or not the catalyst temperature TCAT is higher than a predetermined lower limit temperature T1 (e.g., 500 degrees centigrade) and lower than a predetermined upper limit temperature T3 (e.g., 700 degrees centigrade). If the answer to step S16 is affirmative (YES), the process returns to step S15, in which the SOx removal process is continued.

If TCAT is equal to or less than T1, or TCAT is equal to or greater than T3 in step S16, it is estimated that the temperature of the lean NOx catalyst 22 has deviated from the temperature range in which the SOx can be removed. Accordingly, the process returns to step S11. Consequently, if the SOx removal flag FDeSOx or the DPF regeneration flag FReDPF is equal to "1" in step S11, the DPF regeneration process is performed (step S12).

Figure 3:
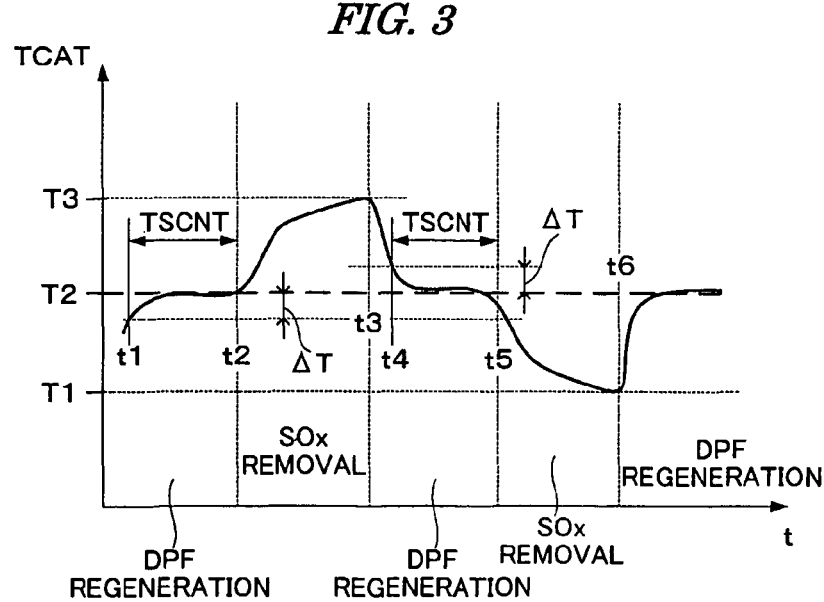
FIG. 3 is a time chart for illustrating a process of FIG. 2.

FIG. 3 is a time chart for illustrating the switching control by the process of FIG. 2. By performing the DPF regeneration process, the catalyst temperature TCAT reaches the predetermined control range at time t1. The DPF regeneration process ends at time t2 when the predetermined continuation time period TSCNT has elapsed from time t1, and the SOx removal process starts. Thereafter, when the catalyst temperature TCAT reaches the predetermined upper limit temperature T3, the SOx removal process ends and the DPF regeneration process starts (time t3). When the catalyst temperature TCAT reaches the predetermined control range at time t4 and the predetermined continuation time period TSCNT has elapsed from time t4, the DPF regeneration process is switched to the SOx removal process (time t5). Thereafter, when the catalyst temperature TCAT reaches the predetermined lower limit temperature T1, the SOx removal process is switched to the DPF regeneration process (time t6).

According to the embodiment as described above, the feedback control to the post injection amount TPST is performed in the DPF regeneration process so that the catalyst temperature TCAT coincides with the target temperature T2. When the predetermined continuation time period TSCNT has elapsed from the time the catalyst temperature TCAT reached the predetermined control range in the vicinity of the target temperature T2 during the DPF regeneration process, the DPF regeneration process is terminated and the SOx removal process is started. Since the temperature required to burn particulates in the DPF 23 is close to the temperature required to remove sulfur oxide, it is possible to remove the sulfur oxide by appropriately setting the target temperature T2.

Further, in the SOx removal process, the concentration of reducing components in the exhaust gases is raised by the post injection (i.e., the exhaust gases are put in the reducing state by the post injection), and the post injection amount TPST is controlled so that the converted air-fuel ratio AFC coincides with the predetermined rich air-fuel ratio AFRO. When the catalyst temperature TCAT has deviated from a range defined by the predetermined lower limit temperature T1 and the predetermined upper limit temperature T3 during the SOx removal process, the SOx removal process is terminated and the DPF regeneration process is started. When the catalyst temperature TCAT becomes too high or becomes too low during the SOx removal process, the SOx removal process is switched to the DPF regeneration process. Accordingly, the catalyst temperature TCAT is controlled to the temperature in the vicinity of the target temperature T2, which makes it possible to appropriately perform the DPF regeneration process and to restart the SOx removal process.

In this embodiment, the lean NOx catalyst 22 corresponds to the NOx removing means, and the catalyst temperature sensor 24 corresponds to the temperature detecting means. Further, the ECU 5 and the fuel injection valve 6 constitute the sulfur oxide removing means and the regeneration means, and the ECU 5 constitutes the switching control means. Specifically, step S12 of FIG. 2 corresponds to the regeneration means, step S15 corresponds to the sulfur oxide removing means, and steps S13, S14, and S16 correspond to the switching control means.

Second Embodiment

Figure 4:
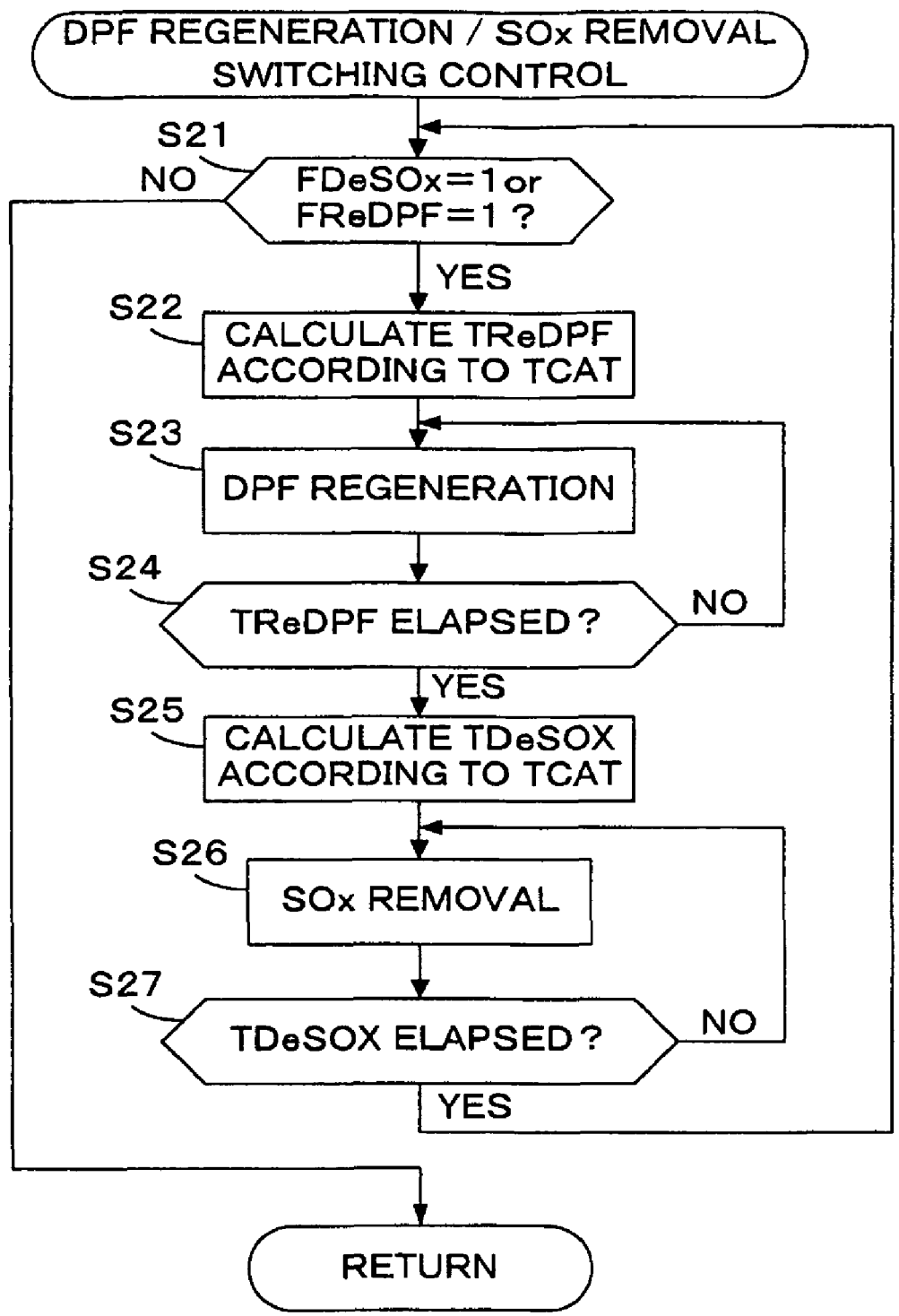
FIG. 4 is a flowchart (second embodiment) of the process for performing the regeneration process of the particulate filter and the sulfur oxide removal process of the lean NOx catalyst.

FIG. 4 is a flowchart showing a method of the switching control of the DPF regeneration process and the SOx removal process therefor according to a second embodiment of the present invention. In this embodiment, an execution time period TReDPF of the DPF regeneration process (hereinafter referred to as "DPF regeneration time period TReDPF") and an execution time period TDeSOx of the SOx removal process (hereinafter referred to as "SOx removal time period TDeSOx") are respectively set according to the catalyst temperature TCAT at the time when each process starts. The second embodiment is the same as the first embodiment except for the points described below.

In step S21, it is determined whether or not the SOx removal flag FDeSOx or the DPF regeneration flag FReDPF is equal to "1". If the answer to step S21 is affirmative (YES), a TReDPF table shown in FIG. 5A is retrieved according to the present value of the catalyst temperature TCAT, to calculate the DPF regeneration time period TReDPF (step S22).

The TReDPF table is set so that the DPF regeneration time period TReDPF decreases as the catalyst temperature TCAT becomes higher.

In step S23, the DPF regeneration process is performed. In step S24, it is determined whether or not the DPF regeneration time period TReDPF has elapsed from the time the DPF regeneration process is started. While the answer to step S24 is negative (NO), the DPF regeneration process is continued (step S23). If the answer to step S24 becomes affirmative (YES), the process proceeds to step S25.

In step S25, a TDeSOx table shown in FIG. 5B is retrieved according to the present value of the catalyst temperature TCAT to calculate a SOx removal time period TDeSOx. The TDeSOx table is set so that the SOx removal time period TDeSOx increases as the catalyst temperature TCAT becomes higher. In step S26, the SOx removal process is performed. In step S27, it is determined whether or not that the SOx removal time period TDeSOx has elapsed from the time when the SOx removal process started. While the answer to step S27 is negative (NO), the process returns to step S26. If the answer to step S27 becomes affirmative (YES), the process returns to step S21.

According to the process of FIG. 4, the DPF regeneration process is performed, as shown in FIG. 6, for the DPF regeneration time period TReDPF, and the SOx removal process is subsequently performed for the SOx removal time period TDeSOx. This execution pattern is repeated as required. In the process of FIG. 4, the DPF regeneration time period TReDPF and the SOx removal time period TDeSOx are respectively set according to the catalyst temperature TCAT at the time the DPF regeneration process or the SOx removal process is started. When the catalyst temperature TCAT is comparatively high, the SOx removal process can be performed for a comparatively long time period and the catalyst temperature TCAT can be normally reduced by performing the SOx removal process. On the other hand, when the catalyst temperature TCAT is comparatively low, the temperature of the exhaust gases flowing into the DPF 23 can be raised to burn the particulates trapped in the DPF 23 by performing regeneration process for a comparatively long time period. Accordingly, by setting the execution time period of each process according to the catalyst temperature TCAT at the time each process is started, the SOx removal process and the DPF regeneration process can be performed while maintaining the catalyst temperature TCAT at an appropriate temperature.

In this embodiment, steps S26 and S23 of FIG. 4 respectively correspond to the regeneration means and the sulfur oxide removing means. Steps S22, S24, S25, and S27 correspond to the switching control means.

The present invention is not limited to the embodiments described above, and various modifications may be made. For example, in the above-described embodiments, the temperature of the catalyst in the catalytic converter 21 disposed most upstream of the exhaust pipe 4 is used as the "exhaust system temperature". Alternatively, the temperature of the exhaust gases discharged from the catalytic converter 21 may be used as the "exhaust system temperature." Further, the present invention is applicable also to an engine in which the catalytic converter 21 is not provided. With respect to such engine, a temperature of the lean NOx catalyst 22 or a temperature of the exhaust gases discharged from the lean NOx catalyst 22 can be used as the "exhaust system temperature".

Further, in the above-describe first embodiment, the DPF regeneration process is switched to the SOx removal process when the predetermined continuation time period TSCNT has elapsed from the time the catalyst temperature TCAT reaches the predetermined control range (T2±ΔT). Alternatively, the SOx removal process may be started immediately after the catalyst temperature TCAT reaches the predetermined control range (T2±ΔT) in the vicinity of the target temperature T2.

Further, in the above-described embodiments, an example in which the lean NOx catalyst 22 is provided upstream of the DPF 23 is shown. Alternatively, the present invention is also applicable to an engine in which the DPF is provided upstream of the lean NOx catalyst.

The present invention can be applied also to an exhaust gas purifying apparatus for a watercraft propulsion engine such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An exhaust gas purifying apparatus for an internal combustion engine, said exhaust gas purifying apparatus comprising:
   NOx removing means provided in an exhaust system of said engine;
   a particulate filter provided in said exhaust system;
   temperature detecting means for detecting a temperature of said exhaust system;
   sulfur oxide removing means for performing a process for removing sulfur oxide accumulated in said NOx removing means by supplying reducing components to said exhaust system so as to place the exhaust gases of said engine in a reducing state;
   regeneration means for performing a regeneration process for burning particulates trapped in said particulate filter by performing a temperature control operation so that the exhaust system temperature coincides with a target temperature; and
   switching control means for performing a switching control which makes said sulfur oxide removing means and said regeneration means alternately operate, when it is determined to be necessary to perform at least one of removal of the sulfur oxide in said NOx removing means and regeneration of the particulate filter,
   wherein said switching control means stops operation of said regeneration means when the exhaust system temperature stays in a predetermined control range in the vicinity of the target temperature for a predetermined time period during the operation of said regeneration means, and starts operation of said sulfur oxide removing means,
   wherein said switching control means stops operation of said sulfur oxide removing means when the exhaust system temperature has deviated from a predetermined limit range during the operation of said sulfur oxide removing means, and starts operation of said regeneration means.

2. An exhaust gas purifying apparatus according to claim 1, wherein the exhaust system temperature is a temperature in the vicinity of said NOx removing means.

3. An exhaust gas purifying apparatus according to claim 1, further comprising an exhaust gas purifying catalyst disposed upstream of said NOx removing means and said particulate filter in said exhaust system of said engine,
   wherein the exhaust system temperature is a temperature in the vicinity of said exhaust gas purifying catalyst.

4. An exhaust gas purifying apparatus, for an internal combustion engine, said exhaust gas purifying apparatus comprising:
   NOx removing means provided in an exhaust system of said engine;
   a particulate filter provided in said exhaust system;
   temperature detecting means for detecting a temperature of said exhaust system;
   sulfur oxide removing means for performing a process for removing sulfur oxide accumulated in said NOx removing means;
   regeneration means for performing a regeneration process for burning particulates trapped in said particulate filter; and
   switching control means for performing a switching control which makes said sulfur oxide removing means and said regeneration means alternately operate, when it is determined to be necessary to perform at least one of removal of the sulfur oxide in said NOx removing means and regeneration of the particulate filter,
   wherein said switching control means performs the switching control according to the exhaust system temperature detected by said temperature detecting means,
   wherein said switching control means sets a first time period in which said sulfur oxide removing means operates and a second time period in which said regeneration means operates according to the exhaust system temperature detected by said temperature detecting means, and makes said sulfur oxide removing means and said regeneration means respectively operate for the corresponding set time period,
   wherein the first time period is set so as to be longer as the exhaust system temperature becomes higher, and the second time period is set so as to be shorter as the exhaust system temperature becomes higher.

5. An exhaust gas purifying method for an internal combustion engine provided with a NOx removing device and a particulate filter in an exhaust system of said engine, said exhaust gas purifying method comprising the steps of:
   detecting a temperature of said exhaust system; and
   performing a switching control for alternately performing a sulfur oxide removing process for removing sulfur oxide accumulated in said NOx removing device by supplying reducing components to said exhaust system so as to place the exhaust gases of said engine in a reducing state and a regeneration process for burning particulates trapped in said particulate filter by performing a temperature control operation so that the exhaust system temperature coincides with a target temperature, when it is determined to be necessary to perform at least one of removal of the sulfur oxide in said NOx removing device and regeneration of the particulate filter,
   wherein the switching control is performed so that the regeneration process is terminated when the exhaust system temperature stays in a predetermined control range in the vicinity of the target temperature for a predetermined time period during the regeneration process, and the sulfur oxide removing process is started.

6. An exhaust gas purifying method according to claim 5, wherein the exhaust system temperature is a temperature in the vicinity of said NOx removing device.

7. An exhaust gas purifying method according to claim 5, wherein said engine is further provided with an exhaust gas purifying catalyst disposed upstream of said NOx removing device and said particulate filter in said exhaust system, wherein the exhaust system temperature is a temperature in the vicinity of said exhaust gas purifying catalyst.

8. An exhaust gas purifying method for an internal combustion engine provided with a NOx removing device and a particulate filter in an exhaust system of said engine, said exhaust gas purifying method comprising the steps of:

detecting a temperature of said exhaust system; and performing a switching control for alternately performing a process for removing sulfur oxide accumulated in said NOx removing device and a regeneration process for burning particulates trapped in said particulate filter, when it is determined to be necessary to perform at least one of removal of the sulfur oxide in said NOx removing device and regeneration of the particulate filter, wherein the switching control is performed according to the detected exhaust system temperature, wherein a first time period in which the sulfur oxide removing process is performed and a second time period in which the regeneration process is performed, are set according to the detected exhaust system temperature, and the sulfur oxide removing process and the regeneration process are performed respectively for the corresponding set time period, wherein the first time period is set so as to be longer as the exhaust system temperature becomes higher, and the second time period is set so as to be shorter as the exhaust system temperature becomes higher.

\* \* \* \* \*